April 26, 1938.   J. KOSTEN   2,115,493

FISHHOOK AND BAIT RETAINER THEREFOR

Filed Jan. 25, 1936

INVENTOR.
Johannes Kosten

BY Chappell, Earl T Chappell
ATTORNEYS

Patented Apr. 26, 1938

2,115,493

UNITED STATES PATENT OFFICE 2,115,493

FISHHOOK AND BAIT RETAINER THEREFOR

Johannes Kosten, Grand Rapids, Mich.

Application January 25, 1936, Serial No. 60,772

12 Claims. (Cl. 43—27)

The main objects of this invention are:

First, to provide a bait retainer for use with a fish hook to hold a bait securely thereon.

Second, to provide a bait retainer of the class described which may be readily applied to and removed from a standard type of fish hook.

Third, to provide a bait retainer which is simple in construction and capable of being produced at small cost.

Fourth, to provide a bait retainer which retains bait on a hook for a substantial length of time, maintaining the life of the bait.

Objects relating to details and economies of the invention will appear from the description to follow. The invention is defined in the claims.

Preferred embodiments of the invention are illustrated in the accompanying drawing, in which.

Figure 1:
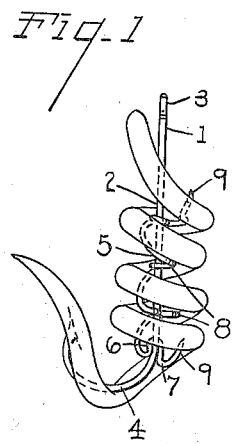
Fig. 1 is a side elevational view of a conventional fish hook with my bait retainer mounted thereon, illustrating its mode of operation.
Figure 2:
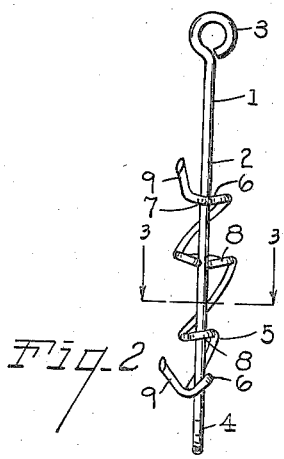
Fig. 2 is an enlarged rear elevational view of a hook and retainer mounted thereon.
Figure 3:
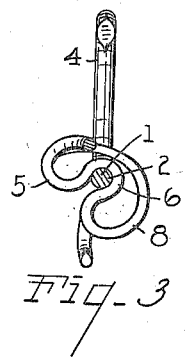
Fig. 3 is a sectional view taken along the line 3—3 of Fig. 2.

The purpose of my invention is to provide a retainer for use with a fish hook, which will allow bait, for example an earth worm, to be mounted on the hook without the messiness attendant upon the threading of a hook through a worm, and further to provide a means for securely mounting the bait on the hook in a position which will simulate a natural position of the bait and maintain the bait alive in that position for a period of time greater than would be attainable were the bait pierced and threaded on the hook. Devices of this nature have been attempted, yet found lacking for the reason that either the bait was not securely held on the hook, so that it could not be readily removed by the biting or nibbling of a fish, or the bait was quickly killed by the action of the retaining means. Further, it is desirable to provide a retainer of the type described which is readily attachable to and detachable from a conventional fish hook rather than being integral with the same. By the provision of a detachable element, quick removal of the retainer is made possible and the hook may be used with or without the retainer. Likewise, the cleaning of the retainer and hook is greatly facilitated and the retainer may be slidably adjusted to any desired position with respect to the hook.

The device of my invention embodies the structure and accomplishes the purposes referred to above which will be hereinafter more fully described.

In the drawing, reference numeral 1 indicates a conventional hook comprising a shank 2, a line receiving eye 3, and a barbed hook 4.

Figure 4:
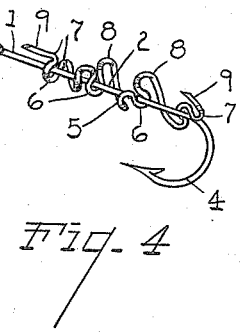
Fig. 4 is a perspective view illustrating more clearly the construction of the device.

I have provided a detachable bait retaining member for cooperation with the hook above described, consisting simply of a wire element 5 which is bent tortuously to provide a plurality of shank engaging loops 6 arranged preferably in line. The bights of the loops are formed to receive the shank of a standard fish hook and, as indicated in Fig. 4, have return bent portions 7 which are closely spaced with respect to one another, whereby a snap-on resilient clamping action is exerted by the portions of the element 5 forming the loops, to the end that the element may be resiliently clamped to the shank 2 of the hook. Medially of the length of the element 5, I provide further loops or projections 8 which constitute supports for a worm or other bait. In Fig. 1, I illustrate the manner of mounting a worm on my improved bait retainer, and it will be seen that the worm is spirally wound about the hook, the medial portions thereof being supported and engaged by the loops 8, the worm being anchored securely thereto by terminal prongs or fingers 9 of the element 5 which are adapted to be imbedded in the bait to securely hold the same with respect to the hook. If desired, one end of the bait may be imbedded on the barbed end of the hook 4 as indicated in Fig. 1. The loops 6, as has been described, securely clamp the element 5 on the shank of the hook. The reaches connecting the engaging members are preferably spirally disposed as shown.

By the above construction, a worm or other bait such as crickets, grasshoppers, grubs and minnows may be effectively secured and held in a fixed life-like position on a hook and life is maintained in the worm for a considerable length of time. The element may be readily slipped off the hook for cleaning purposes and may further be adjusted to various positions along the length of the shank 2 in which positions it will be firmly held by the clamping action of bights 6. Since my bait retainer is an integral detached spring element, it may be used with a plurality of shapes and sizes of hooks and accordingly will recommend itself over hooks having bait retaining means mounted integrally thereon. The retaining element of my invention may be cheaply produced in large quantities.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In combination with a fishing hook having a shank, a bait retainer comprising an element bent to provide a plurality of resilient loops arranged to snap on said shank, said element having portions medially thereof constituting bait supporting means and end portions adapted to be imbedded in the bait to anchor the same.

2. The combination with a fish hook provided with a shank, of a bait retainer comprising a wire element bent to provide a plurality of intermediate partially closed loops adapted for snap engagement with the shank of the hook when presented transversely thereto, the said loops being connected by spirally disposed reaches, and end loops, the latter terminating in bait engaging prongs.

3. The combination with a fish hook provided with a shank, of a bait retainer comprising a wire element conformed to provide a plurality of bait engaging members and an intermediate partially closed loop adapted for snap engagement with the shank of the hook.

4. The combination with a fish hook provided with a shank, of a bait retainer formed of wire bent to provide a series of spaced laterally opening shank engaging and gripping loops, and a plurality of spirally disposed reaches connecting said loops, the retainer terminating at each end in bait engaging prongs, the loops being disposed transversely of the shank so that a bait may be spiraled around the shank between the loops and in supporting engagement therewith and engaged with the said prongs.

5. The combination with a fish hook provided with a shank, of a bait retainer formed of wire conformed to provide spaced intermediate snap-on shank engaging loops, reaches connecting said loops, and end loops, the loops each terminating in a bait engaging prong, the loops being disposed transversely of the shank so that a bait may be disposed in engagement therewith and with the said prongs.

6. The combination with a fish hook provided with a shank, of a bait retainer formed of wire conformed to provide a plurality of spaced bait engaging members and laterally opening shank engaging loops, there being a plurality of spirally disposed reaches connecting said loops, the retainer terminating in a bait engaging prong.

7. A bait retainer for a fishing hook comprising a resilient element bent tortuously to provide a plurality of laterally opening hook engaging loops and having bait supporting portions medially of said element and terminal bait anchoring fingers, said element being adapted to be removably attached to the shank of a fishing hook by snapping said loops into clamping engagement with said shank.

8. A bait retainer for a fishing hook comprising a resilient element bent tortuously to provide a plurality of laterally opening hook engaging loops and having bait supporting portions medially of said element, said element being adapted to be removably attached to the shank of a fishing hook by snapping said loops into clamping engagement with said shank.

9. A bait holder for fish hooks comprising a plurality of spaced laterally opening shank engaging loops adapted to be sprung into engagement with the shank of a fish hook, said loops being connected by spirally disposed reaches, the retainer terminating at both ends in bait engaging prongs.

10. A bait holder for fish hooks comprising a plurality of spaced laterally opening shank engaging loops adapted to be sprung into engagement with the shank of a fish hook, said loops being connected by spirally disposed reaches, the retainer terminating at one end at least in bait engaging prongs.

11. A bait holder for fish hooks formed integrally of wire and comprising terminal bait engaging prongs and connected spaced laterally opening shank engaging loops adapted to be sprung into engagement with the shank of a fish hook, said loops being connected by spirally disposed reaches.

12. A bait holder for fish hooks comprising integral bait engaging members, and a plurality of spaced connected laterally opening shank engaging loops adapted to be sprung into engagement with the shank of a fish hook.

JOHANNES KOSTEN.